United States Patent
Valli et al.

(10) Patent No.: US 12,486,582 B2
(45) Date of Patent: Dec. 2, 2025

(54) APPARATUS FOR GENERATING HYDROGEN AND OXYGEN THROUGH ALKALINE ELECTROLYSIS, AND CORRESPONDING PROCESS

(71) Applicant: HYTER S.R.L., Desenzano del Garda (IT)

(72) Inventors: Alberto Valli, Desenzano del Garda (IT); Emanuele Castioni, Sommacampagna (IT)

(73) Assignee: HYTER S.R.L., Desenzano del Garda (IT)

( * ) Notice: Subject to any disclaimer, the term of this patent is extended or adjusted under 35 U.S.C. 154(b) by 577 days.

(21) Appl. No.: 17/919,869

(22) PCT Filed: Apr. 23, 2021

(86) PCT No.: PCT/EP2021/060723
§ 371 (c)(1),
(2) Date: Oct. 19, 2022

(87) PCT Pub. No.: WO2021/214318
PCT Pub. Date: Oct. 28, 2021

(65) Prior Publication Data
US 2023/0160074 A1    May 25, 2023

(30) Foreign Application Priority Data

Apr. 23, 2020 (IT) .......... 102020000008785
Apr. 20, 2021 (IT) .......... 102021000010040

(51) Int. Cl.
| | | |
|---|---|---|
| C25B 1/04 | (2021.01) | |
| C25B 9/05 | (2021.01) | |
| C25B 9/19 | (2021.01) | |
| C25B 9/63 | (2021.01) | |
| C25B 9/65 | (2021.01) | |
| C25B 11/052 | (2021.01) | |
| C25B 11/061 | (2021.01) | |
| C25B 11/081 | (2021.01) | |
| C25B 11/089 | (2021.01) | |
| C25B 13/08 | (2006.01) | |

(52) U.S. Cl.
CPC .............. *C25B 1/04* (2013.01); *C25B 9/05* (2021.01); *C25B 9/19* (2021.01); *C25B 9/63* (2021.01); *C25B 9/65* (2021.01); *C25B 11/052* (2021.01); *C25B 11/061* (2021.01); *C25B 11/081* (2021.01); *C25B 11/089* (2021.01); *C25B 13/08* (2013.01)

(58) Field of Classification Search
CPC ...................................... C25B 1/04
See application file for complete search history.

(56) References Cited

U.S. PATENT DOCUMENTS

2003/0057088 A1    3/2003   Ichikawa
2009/0308738 A1*  12/2009   Richards ............. C25B 9/19
                                                              204/252

* cited by examiner

*Primary Examiner* — Hosung Chung
(74) *Attorney, Agent, or Firm* — Carmel Patent Agency; Robert Ballarini (57) ABSTRACT

An apparatus is provided for generating hydrogen and oxygen through alkaline electrolysis. A process is also provided for generating hydrogen and oxygen through alkaline electrolysis using the apparatus. The apparatus and process are advantageously applied in apparatuses and systems for the accumulation of hydrogen using demineralized water and electric energy, also coming from renewable sources.

20 Claims, 3 Drawing Sheets fig. 1

Prepare at least one apparatus (10) comprising:

- a pair of current-holder metal plates (1, 2) to which a direct electric current between 1 A and 250 A, preferably equal to 125 A, is applied;

- a casing (3) made of an electrically non-conductive material and having a mechanical resistance ranging between 50 and 100 N/mm$^2$, preferably equal to 77 N/mm$^2$, able to bear the internal relative pressure ranging between 1 and 50 bar, preferably equal to 30 bar, of a gas;

- a pair of metal electrode-holders (4, 5), each electrode-holder (4, 5) being porous and able to absorb an aqueous solution and having a compression mechanical resistance ranging between 1.5 and 8 MPa, preferably equal to 4 MPa, to resist to the deformation impressed by the internal pressure while maintaining flatness;

- a pair of electrodes (6, 7), each electrode being placed in contact with the corresponding electrode-holder (4, 5) and being made with nanometric powders of metal mixtures deposited on each corresponding electrode-holder (4, 5);

- a polymeric membrane (8) made of an electrically non-conductive material, porous to the aqueous solution but not to the gas and having a mechanical resistance at normal pressure ranging between 10 and 15 MPa, preferably equal to 13.5 MPa

100

⇩ by means of the pair of metal electrode-holders (4, 5), let the aqueous solution flow uniformly distribute over the whole surface of the electrodes (6, 7) and carry the electric current from the current-holder metal plates (1, 2) to the electrodes (6, 7);

101

⇩ generate hydrogen ($H_2$) and oxygen ($O_2$) through alkaline electrolysis of the aqueous solution.

102 fig. 2 fig. 3 fig. 4

APPARATUS FOR GENERATING HYDROGEN AND OXYGEN THROUGH ALKALINE ELECTROLYSIS, AND CORRESPONDING PROCESS

FIELD OF THE INVENTION

The present invention concerns the field of apparatuses for the production of gaseous hydrogen and oxygen.

In particular, the present invention concerns the field of apparatuses for the production of gaseous hydrogen and oxygen by electrolysis of water.

The present invention also concerns the process for the production of gaseous hydrogen and oxygen by means of the above apparatuses.

The present invention is advantageously applied in apparatuses and systems for the accumulation of hydrogen using demineralized water and electric energy, also coming from renewable sources.

BACKGROUND OF THE INVENTION

Hydrogen and oxygen can be produced in various ways, including the electrolytic process of water dissociation; this process is one of the cheapest and has a very low environmental impact, with the possibility of using electricity produced from renewable sources.

Hydrogen is considered as one of the best energy carriers in the world and plays a fundamental role in world energy policies when it is necessary to accumulate energy coming mostly from renewable sources, to then be re-converted or exploited when necessary.

Hydrogen is also a gas that is used in various chemical processes on an industrial level.

Traditional electrolytic systems consist of two metal electrodes (anode and cathode) immersed in an aqueous solution of an alkaline or acid electrolyte which has the task of carrying the electrons from a positive electrode (anode) to a negative one (cathode); once a direct current voltage is applied to the two electrodes, hydrogen and oxygen gases are produced, respectively hydrogen is produced at the cathode and oxygen is produced at the anode.

The electrolysis process can be summarized as follows:

cathodic half-reaction: $2H_2O + 2e^- \rightarrow H_2 + 2OH^-$ anodic half-reaction: $H_2O \rightarrow \frac{1}{2}O_2 + 2H^+ + 2e^-$.

To facilitate the electrolytic process, two catalysts formed by different noble and non-noble metals and their alloys are normally deposited on the electrodes.

Industrially, electrolytic apparatuses—commonly called electrolytic cells—have different shapes and sizes and are separated into two halves—commonly called half-cells—between which there is a polymeric membrane or a liquid containing a percentage of salt or an alkaline electrolytic element.

Generally, potassium hydroxide (KOH) or sodium hydroxide (NaOH) is used as an electrolytic agent in percentages between 1 and 30% by weight, unbalancing the pH of the electrolytic solution toward values greater than 10, and therefore in a basic environment.

The half-cells have a shape and structure such that there is no mixing of gases during production, which would lead to the formation of a highly explosive mixture of hydrogen and oxygen gas.

Electrolytic systems are commercially available which have a solid polymeric dividing wall which not only creates a barrier against the mixing of the gases, but also functions as an electrolyte.

One example of this technology are acid electrolytic cells in which a polymeric membrane allows both the exchange of ions between the two electrodes, facilitating the electrolytic process, and also the physical separation of gases, to prevent possible mixtures of them; this technology is used when the electrolyte solution consists of ultra-pure water.

This technology is also able to accumulate hydrogen and oxygen at a differential pressure in the two half-cells in a ratio of up to 40:1 (40 bar of hydrogen, 1 bar of oxygen).

This type of technology is the most promising with regard to both the safety of the apparatuses and also production efficiencies, although it has a negative cost aspect since catalysts are used that are exclusively made with noble metals such as platinum (Pt), ruthenium (Ru) and iridium (Ir), the only ones that allow the electrolytic process to take place in an acidic environment.

The market is moving toward an electrolytic cell configuration similar to the acid one described above, but with alkaline technology that allows to use a wider choice of metals as catalysts, including those of the family of non-noble metals, and that can exploit renewable energies as a primary energy source, as well as producing high purity hydrogen under pressure.

An example of such technologies is described in the European Patent n. EP 2 451 992 B1.

This document describes an alkaline electrolytic system consisting of two half-cells separated by an anionic exchange membrane on which the cathode catalyst is electro-deposited, while the anodic catalyst is deposited on a conductive support; this apparatus uses an alkaline aqueous solution to produce hydrogen under pressure and dry, that is, without humidity.

Document US 2003/0057088 A1 is also known, which describes a cell for the electrolysis of water having two catalytic levels between which an electrolytic membrane is interposed and which comprise an anode catalytic level which contains a catalyst comprising an alloy of ruthenium and iridium and at least one metal selected from a group comprising iron, nickel and cobalt. However, the limitations and disadvantages of these documents are a low efficiency and the difficulty of adapting different types of catalysts.

Document US 2009/0308738 A1 is also known, which describes a device for electrolysis having a half-cell for hydrogen and a half-cell for oxygen. Each half-cell comprises an electrode interposed between two internal distancing walls and an external distancing wall. Furthermore, a gas separation membrane is interposed between the two internal distancing walls of the half-cell for hydrogen and the two internal distancing walls of the half-cell for oxygen.

This solution, in addition to having the limits mentioned above for the other two known documents, also has the disadvantage of having a rather complex structure that makes it difficult to produce and assemble.

An apparatus for generating hydrogen and oxygen through alkaline electrolysis and the corresponding process, able to produce hydrogen at an efficiency greater than 85% (on higher calorific value) and at a pressure of 30 bar without using external compressors, would satisfy the need to accumulate gaseous hydrogen at a sufficient pressure to store surplus and/or renewable electric energy with better efficiency.

It should be noted that being able to accumulate at high efficiency means being able to capture as much energy as possible at input.

The present invention intends to respond to the requirement as above.

In particular, the present invention intends to solve the technical problem of producing hydrogen and oxygen at a pressure of 30 bar with a pressure difference between hydrogen and oxygen of 30:1.

Furthermore, the present invention intends to solve the technical problem of producing hydrogen and oxygen at an efficiency of around 85% (on higher calorific value).

Finally, the present invention intends to solve the technical problem of using internal components and catalysts for the electrodes which can provide the greatest efficiency without forgetting the production costs.

In summary, therefore, up to the present moment, to the knowledge of the Applicant, there are no known solutions that allow to provide an apparatus for generating hydrogen and oxygen through alkaline electrolysis and the corresponding process, that can work at the efficiency conditions as above.

Therefore, with the apparatus for generating hydrogen and oxygen through alkaline electrolysis and the corresponding process according to the present invention, the Applicant intends to remedy this deficiency.

PURPOSES AND SUMMARY OF THE INVENTION

The purpose of the present invention is to overcome the disadvantages of the state of the art related to the difficulty in producing an efficient machine.

More precisely, one possible purpose is to solve the problem of producing hydrogen not contaminated by the electrolytic substance with an initial purity around 99% by volume.

In fact, normally, in order to produce hydrogen and oxygen it is necessary for the electrodes to be immersed in the electrolytic solution, this causing the production of completely humid or contaminated gas and implying the presence of a purification system downstream of the electrolytic process, which removes all the contaminants from the flow of gas at exit, resulting in additional costs and loss of overall efficiency. To reduce the effect of hydrogen contamination, according to one embodiment the cathode part of the apparatus described here—contrary to the anode one—is not immersed in an aqueous solution and a polymeric membrane, as well as dividing the apparatus into two sections (anode and cathode) creating a physical barrier to the mixing of the two gases, is able to carry small quantities of water from one part to the other so as to be able to form hydrogen and oxygen contaminated only in minimal part.

In particular, in this way, the hydrogen—although it has traces of humidity—has a fairly high purity at exit, that is, a purity higher than 99.5% by volume, so that it is possible to simply use some relatively inexpensive drying systems based on silica gel or molecular sieves or de-hydrators, in order to increase its purity.

In another embodiment, on the other hand, the cathode part of the apparatus is at least partly immersed in an aqueous solution, at least when the apparatus is started, that is, before the apparatus starts to produce hydrogen and oxygen. Consequently, in this embodiment the production of hydrogen from aqueous solution takes place starting from a wet cathode and the aqueous solution is also present, at least at start-up, in the cathode part, or half-cell. This configuration allows to humidify the polymeric membrane as above more quickly than the embodiment that provides that the aqueous solution is present only on the anode part. Advantageously, having a degree of humidity, or hydration, also on the cathode part, or face, of the polymeric membrane when the apparatus is started promotes the anionic transfer from cathode to anode and decreases the amount of time that passes between starting the apparatus and the beginning of the production of hydrogen and oxygen by the same apparatus. Advantageously, the alkaline electrolysis allows to use a wide range of metals and their alloys as catalysts in an alkaline environment, that is, with a typically basic electrolyte, such as potassium hydroxide (KOH), in an aqueous solution, this promoting one of the factors of expansion on the market linked to the production and procurement costs of noble metals, as in acid technology. Advantageously, the apparatus for generating hydrogen and oxygen through alkaline electrolysis according to the present description has a resistance to the internal pressure of the cathode volume up to 30 relative bars, which allows to accumulate a greater volume of hydrogen gas in a cylinder; in particular, the mechanical structure of the apparatus, also comprising the internal supports and the gas seals, is designed in such a way that a nominal pressure difference between the two gases equal to 30:1 (30 bar hydrogen, 1 bar oxygen) can be created, without loss of electrical efficiency. Specifically, the above purposes and advantages of the invention, as well as others, as will become clear from the following description, are achieved with an apparatus for generating hydrogen and oxygen through alkaline electrolysis according to claim 1. Some preferred embodiments and variants of the apparatus according to the present description form the subject of dependent claims from 2 to 15.

Another independent aspect of the present description concerns a process for generating hydrogen and oxygen through alkaline electrolysis and constitutes the subject of claim 17. Some preferred embodiments and variants of the process according to the present description constitute the subject of the respective dependent claims.

It is understood that all the attached claims form an integral part of the present description and that each of the technical characteristics claimed therein is possibly independent and can be used independently with respect to the other aspects of the invention.

It will be immediately clear that any number of modification can be made to what has been described (for example relating to shape, size, dispositions and parts with equivalent functionalities) without departing from the scope of protection of the invention as claimed in the attached claims.

Advantageously, the technical solution according to the present invention, which provides an apparatus for generating hydrogen and oxygen through alkaline electrolysis and the corresponding process, allows to:

produce hydrogen and oxygen;
increase the electrical efficiency;
decrease the specific production energy;
capture fluctuating electric currents typical of renewable energy systems;
produce hydrogen under pressure at 30 relative bars;
obtain a good purity of the gas at exit, that is to say, with a purity higher than 99.5% by volume;
use an electrolyte solution with a percentage by weight of 1-3% of potassium hydroxide (KOH);
use a process water according to the ASTM Type II standard;
use non-noble metals for the anodic catalysts;
use internal geometric shapes to obtain high efficiencies.

Other advantageous characteristics will become clearer from the following description of some preferred but not exclusive embodiments, provided purely by way of a non-restrictive example.

BRIEF DESCRIPTION OF THE DRAWINGS

The present invention will be described hereafter by means of some preferred embodiments, given as a non-restrictive example with reference to the attached drawings. These drawings show different aspects and examples of the present invention and, where appropriate, structures, components, materials and/or elements that are similar in different drawings have been indicated with similar reference numbers.

FIG. 2 is a flow chart of the process for generating hydrogen and oxygen through alkaline electrolysis according to some embodiments;

DETAILED DESCRIPTION OF THE INVENTION

While the invention is susceptible to various modifications and alternative constructions, the drawings show some preferred embodiments which are described in detail below.

It is clear, however, that there is no intention of limiting the invention to the specific embodiments shown here; on the contrary, the invention is intended to cover all modifications, alternative and equivalent constructions that fall within the scope of the invention as defined in the claims.

Therefore, in the following description the use of "for example", "etc.", "or/that is" indicates non-exclusive alternatives without any limitation whatsoever, unless otherwise indicated; the use of "also" means "including, but not limited to" unless otherwise indicated; the use of "includes/comprises" means "includes/comprises, but is not limited to" unless otherwise indicated.

Some embodiments of the apparatus for generating hydrogen and oxygen through alkaline electrolysis and the corresponding process of the present description are based on the concept of using the cathode part of the apparatus—as opposed to the anode one—not immersed in an aqueous solution and of providing a polymeric membrane which, in addition to dividing the apparatus into two sections (anode and cathode), is able to carry small quantities of water from one part to the other so as to be able to form hydrogen and oxygen without contamination of the hydrogen by electrolytic substances.

Therefore, in some embodiments, the apparatus for generating hydrogen and oxygen through alkaline electrolysis and the corresponding process of the present description do not require the presence of a purification system downstream of the electrolytic process to remove all contaminants from the flow of gas at exit.

Furthermore, with the apparatus for generating hydrogen and oxygen through alkaline electrolysis and with the corresponding process of the present description, the hydrogen—although it has traces of humidity—has a fairly high purity at exit, that is, a purity higher than 99.5% by volume.

Furthermore, the apparatus for generating hydrogen and oxygen through alkaline electrolysis and the corresponding process of the present description allow to increase the electrical efficiency, to capture fluctuating electric currents typical of renewable energy systems and to improve the safety of the gas separation on the production side, since the permeability to gasses of the membrane is very low.

Furthermore, as will be described in more detail below, other embodiments of the apparatus for generating hydrogen and oxygen through alkaline electrolysis and of the corresponding process of the present description provide to produce hydrogen through electrolysis starting from a wet cathode, and in particular to also immerse, at least partly and possibly only in the initial step of the process, that is, before the production of hydrogen, the cathode part of the apparatus in an alkaline aqueous solution.

The present invention can be used in all applications in which there is a requirement to produce hydrogen and oxygen free of contamination, for example applications in industrial fields for the production of hydrogen gas to be used as technical gas, in the energy field for storing hydrogen and subsequent energy recovery, and in the transport sector as a fuel for vehicles.

In the present description, with the term "alkaline electrolysis" we mean the dissociation of the water molecule into hydrogen and oxygen through the passage of a direct electric current.

In the present description, with the term "contamination/contaminated" we mean traces of substances other than hydrogen in the gas flow.

In the present description, with the term "without contamination/not contaminated" we mean that the purity of the hydrogen at exit is greater than 99.9% by volume.

In the present description, with the term "electrode/electrodes" we mean the plates connected to a source of direct electric current which are in contact with the aqueous solution.

In the present description, with the term "cathode/cathode part" we mean the electrode that is connected to the negative pole of a source of direct electric current.

In the present description, with the term "anode/anode part" we mean the electrode that is connected to the positive pole of a source of direct electric current.

In the present description, with the term "polymeric membrane" we mean a solid sheet of electrically non-conductive polymeric material which does not allow the mixing of hydrogen and oxygen.

In the present description, with the term "porous" we mean that the material in question has transverse passage channels for the fluid with a diameter of the order of one micron.

In the present description, with the term "solid" we mean that the material in question does not have transverse passage channels for the fluid.

In the present description, with the term "electrically non-conductive material" we mean that the material in question has no characteristic of electrical conductivity.

In the present description, with the term "gas purity" we mean the quantity by volume of contaminants that are present in the gas flow.

In the present description, with the term "electrical efficiency" we mean the ratio between the electrical energy at entry and the theoretical electrical energy for producing hydrogen equated to the unit of volume and to the higher calorific value of hydrogen.

In the present description, with the term "fluctuating electric currents" we mean the direct electric currents that are not constant in the unit of time.

In the present description, with the term "safety of the separation of the gasses" we mean that a separation of the gases takes place such as to prevent them from mixing.

In the present description, with the term "resistance to internal pressure" we mean the mechanical resistance of the casing that encloses the cathode and anode volumes, which is subjected to an internal pressure of the gas.

Figure 1:
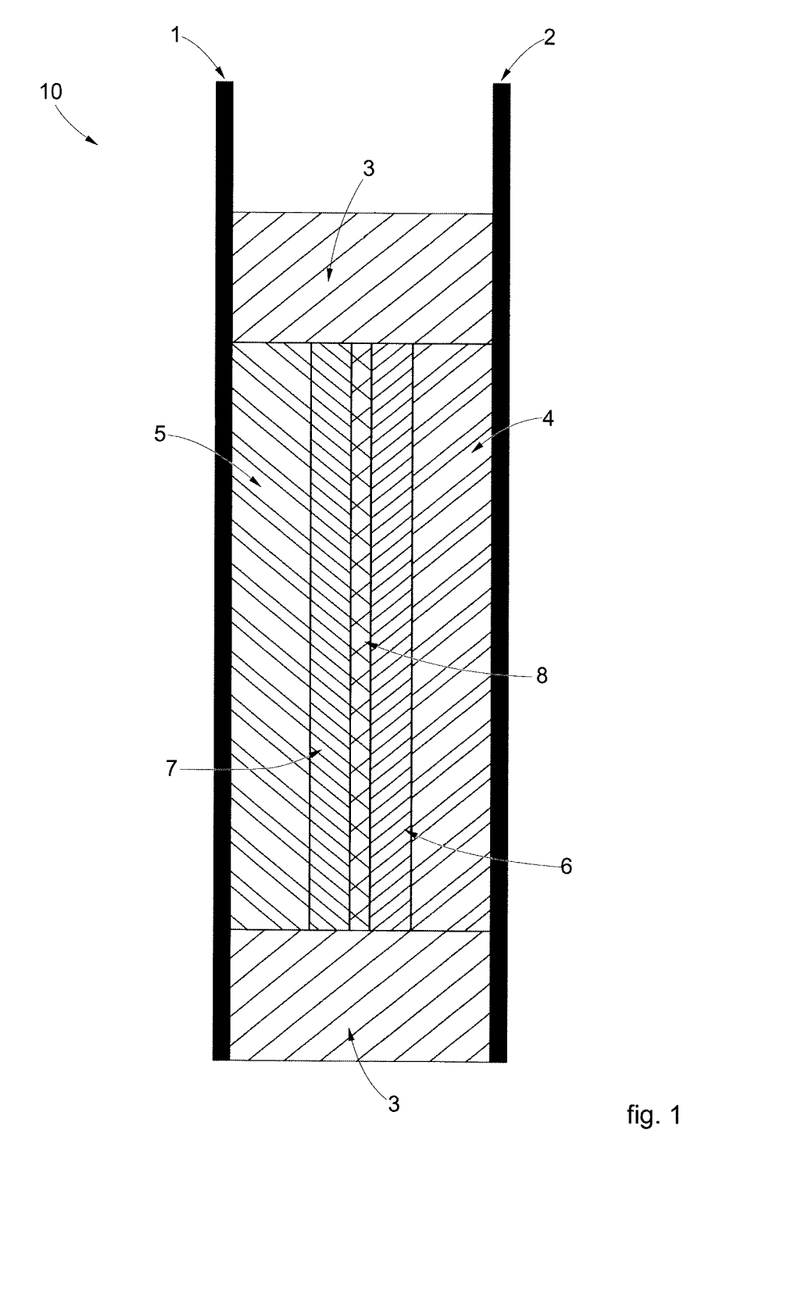
FIG. 1 is a longitudinal section view showing the apparatus for generating hydrogen and oxygen through alkaline electrolysis according to some embodiments.

With reference to FIG. 1, which shows one possible embodiment, it can be seen that the apparatus 10 for generating hydrogen $H_2$ and oxygen $O_2$ through alkaline electrolysis comprises:

- a pair of current-holder metal plates 1, 2 to which a direct electric current between 1 A and 250 A, preferably equal to 125 A, is applied;
- a casing 3 made of an electrically non-conductive material having a mechanical strength ranging between 50 and 100 N/mm$^2$, preferably equal to 77 N/mm$^2$, able to bear the internal relative pressure ranging between 1 and 50 bar, preferably equal to 30 bar, of a gas;
- a pair of metal electrode-holders 4, 5, each electrode-holder 4, 5 being porous and able to absorb an aqueous solution and having a compression mechanical resistance ranging between 1.5 and 8 MPa, preferably equal to 4 MPa, to resist to the deformation impressed by the internal pressure while maintaining flatness with a deviation of 5×10−2 mm;
- a pair of electrodes 6, 7, each electrode being placed in contact with the corresponding electrode-holder 4, 5 and being made with nanometric powders of metal mixtures deposited on each corresponding electrode-holder 4, 5, that is, on chemically suitable supports with characteristics of high electrical conductivity;
- a polymeric membrane 8 made of an electrically non-conductive material, porous to the aqueous solution but not to the gas and having a mechanical resistance at normal pressure ranging between 10 and 15 MPa, preferably equal to 13.5 MPa, wherein the pair of metal electrode-holders 4, 5 has the task of letting the aqueous solution flow uniformly distribute over the whole surface of the electrodes 6, 7 and of carrying the electric current from the current-holder metal plates 1, 2 to the electrodes 6, 7.

Preferably, the pair of current-holder metal plates 1, 2 of the apparatus 10 is made of materials resistant to the alkaline environment; more preferably, it is made of steel or nickel Ni; even more preferably it is made of AISI 316L stainless steel.

Preferably, each current-holder metal plate 1, 2 of the apparatus 10 has a thickness ranging between 0.5 mm and 2 mm; more preferably equal to 1 mm Preferably, the casing 3 is a single container inside which a dividing hollow space is created, able to contain all the elements described here.

Preferably, the electrically non-conductive material of the casing 3 of the apparatus 10 is selected from thermoplastic polymers; more preferably it is acetal resin; the choice of materials is made both to maintain an electrical non-conductivity and also to have good mechanical resistance to internal stress and low water absorption.

Preferably, the gas is selected from Nitrogen, Hydrogen, Oxygen, Helium, more preferably it is Hydrogen.

Preferably, the pair of metal electrode-holders 4, 5 of the apparatus 10 is made of stainless steel or nickel Ni.

Preferably, each metal electrode-holder 4, 5 of the apparatus 10 has a thickness ranging between 1.5 mm and 4 mm; more preferably equal to 2 mm Preferably, each metal electrode-holder 4, 5 of the apparatus 10 has porosity ranging between 30% and 90%, more preferably equal to 85%.

To reduce the electrical resistance between the electrodes and the polymeric membrane, the electrode-holders 4, 5 have sizes and compression mechanical resistance sufficient to resist the deformation impressed by the internal pressure, maintaining the flatness of contact with the electrodes.

Considering also that the aqueous solution flow has to be such that there is a uniform distribution of the liquid, this element is of particular importance for the correct functioning of the apparatus and therefore the geometry of the inflow and outflow of the liquid has been studied in order to create a pressure drop between inlet and outlet.

As stated above, electrode-holders 4, 5 resistant to the basic environment and therefore made of stainless steel or nickel Ni are preferably used, with a certain porosity in both spatial sizes and a compression mechanical resistance equal to the highest nominal pressure of the apparatus increased by a factor of 2.5 for safety reasons.

In some embodiments, the pores of the element are such as to create a pressure drop in the water flow so as to be able to completely wet the anode electrode.

In other embodiments, a lower porosity can be used for the cathode part than for the anode part since, in possible implementations, there is no liquid flow.

To overcome the problem of contact resistance between the electrode and the electrode-holder, the layer closest to the electrode has a very restricted porosity in order to prevent drops and to maintain a surface as smooth and coplanar as possible.

Preferably, the aqueous solution is selected from basic or alkaline solutions, more preferably it is water with the addition of potassium hydroxide.

Preferably, the negative electrode 6 of the apparatus 10 comprises a catalyst made of platinum Pt in a quantity smaller than 1 mg/cm$^2$.

Preferably, the platinum catalyst Pt of the negative electrode 6 is deposited on its own porous and highly electrically conductive support.

Preferably, the positive electrode 7 of the apparatus 10 comprises a catalyst consisting of an iron Fe and nickel Ni alloy.

Preferably, in the iron Fe and nickel Ni alloy the metals are in a ratio ranging between 1 and 3; more preferably, they are in a ratio equal to 2.

More preferably, the catalyst of the positive electrode 7 is deposited on a porous metal support resistant to the alkaline environment made of stainless steel or nickel.

Preferably, the electrically non-conductive material of the polymeric membrane 8 is a plastic material resistant to the alkaline environment selected from thermoplastic materials, more preferably it is polypropylene, having a porosity between 40 and 60%, more preferably equal to 55%, with a diameter of the pores ranging between 0.01 and 0.1 micron, more preferably equal to 0.064 micron.

Preferably, the polymeric membrane 8 has a thickness comprised between 20 and 200 microns, more preferably equal to 25 microns, in order to reduce the resistance to the passage of ions increasing the electrical efficiency.

Preferably, the polymeric membrane 8 consists of a thermoplastic support resistant to the alkaline environment with a porosity between 40 and 60% with a diameter of the pores of only a few microns, sufficient to allow a flow of OH- anions to pass between the anode and cathode compartment promoting the chemical reaction.

This polymeric membrane has to have a thickness comprised between 20 and 50 microns to reduce the resistance to the passage of ions, increasing the electrical efficiency.

The difference in pressure exerted between the two compartments is balanced by the polymeric membrane and therefore the choice of material is also governed by an adequate mechanical resistance, while the mechanical support on which it rests is adequately sized.

Advantageously, the alkaline electrolysis allows to use a wide range of metals and their alloys as catalysts in an alkaline environment, that is, with a typically basic electrolyte, such as potassium hydroxide (KOH), in an aqueous solution, this promoting one of the factors of expansion on the market linked to production costs.

The range of metals and their alloys as catalysts in an alkaline environment includes iron Fe and nickel Ni.

The apparatus for generating hydrogen and oxygen through alkaline electrolysis according to the present description has a good resistance to internal pressure, that is, a resistance greater than 30 relative bars, in order to accumulate a greater volume of hydrogen gas in a cylinder; in particular, the mechanical structure of the apparatus is designed so that a nominal pressure difference between the two gases equal to 30:1 (30 bar hydrogen, 1 bar oxygen) can be created.

Figure 4:
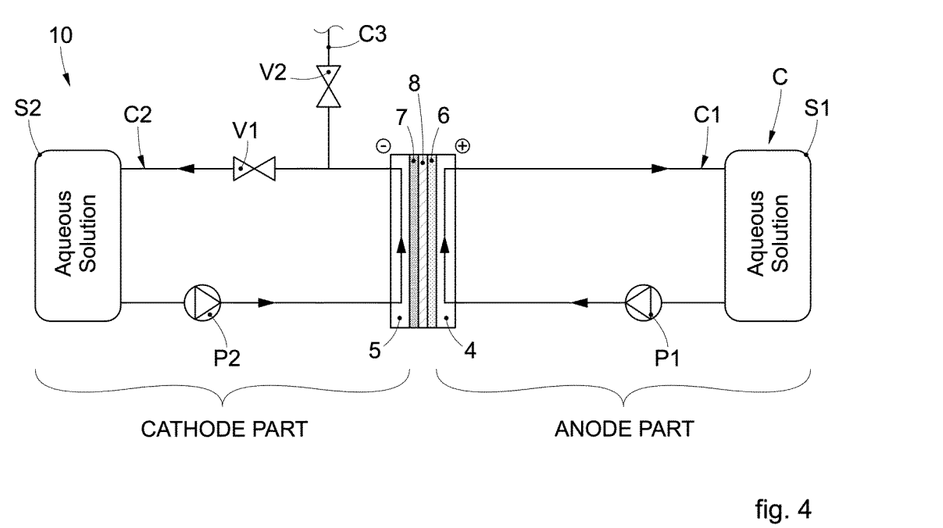
FIG. 4 is a schematic representation that shows the apparatus for generating hydrogen and oxygen through alkaline electrolysis according to other embodiments.

With reference to FIG. 4, another possible embodiment of the apparatus 10 can comprise essentially all the parts described above and, additionally, a hydraulic circuit C that can comprise a first part C1 associated with the anode part of the apparatus 10, and a second part C2 associated with the cathode part of the apparatus 10.

The first part C1 of the hydraulic circuit C is configured to allow a flow of a preferably alkaline aqueous solution toward the anode part of the apparatus 10 and, preferably, into the electrode-holder 4 present therein.

In some embodiments, the first part C1 of the hydraulic circuit C is conformed as a closed loop and comprises a first pump P1 to force the circulation of the aqueous solution which, in the example provided here, is contained in a first tank S1.

Furthermore, the second part C2 of the hydraulic circuit C is configured to allow a flow of an aqueous solution, also preferably alkaline, toward the cathode part of the apparatus 10 and, preferably, into the electrode-holder 5 present therein.

In some embodiments, the second part C2 of the hydraulic circuit C is conformed as a closed loop and comprises a second pump P2 to force the circulation of the aqueous solution which, in the example provided here, is contained in a second tank S2. The second pump P2 is preferably upstream of the electrode-holder 5 present in the cathode part of the apparatus 10.

The second part C2 of the hydraulic circuit C can also comprise a branch C3, preferably disposed downstream of the electrode-holder 5 present in the cathode part of the apparatus 10 and which communicates with the outside of the latter.

Fluidic interception means V1, V2 can be configured to selectively divert the passage of a fluid toward the branch C3.

In particular, a first valve V1 can be disposed in the second part C2 of the hydraulic circuit C, downstream of the branch C3, and a second valve V2 can be disposed in the branch C3.

This conformation allows a recirculation of aqueous solution in the cathode part of the apparatus 10 and, preferably, in the electrode-holder 5 present therein, when the apparatus 10 is started, by keeping the first valve V1 open, the second valve V2 closed and activating the second pump P2.

Therefore, once the apparatus 10 starts to produce hydrogen and oxygen, it is possible to deactivate the second pump P2, close the first valve V1 and open the second valve V2 to allow the gas produced by the apparatus 10 to exit.

In these embodiments, the aqueous solution in the cathode part can have a potassium hydroxide (KOH) concentration between 1 and 3% by weight and the alkaline aqueous solution in the cathode part can have a potassium hydroxide (KOH) concentration lower than 5% by weight.

This allows to humidify the polymeric membrane 8 faster than in the embodiment which provides that the aqueous solution is only on the anode part. Advantageously, also having a degree of humidity, or hydration, on the cathode part or face of the polymeric membrane 8 when the apparatus 10 is started promotes the anionic transfer from cathode to anode and decreases the time that elapses between the start of the apparatus 10 and the beginning of the production of hydrogen and oxygen thereby.

In these embodiments, purification means (not shown) can also be comprised for purifying the gas produced from any residual humidity.

In other possible variants, it can be provided that only one pump and one tank are present. In this case, the second pump P2 coincides with the first pump P1 and the second tank S2 coincides with the first tank S1. In this case, in particular, the second part C2 of the hydraulic circuit C is a branch of the first part C1 (or vice versa) originating downstream of the pump P1 (or P2) and preferably able to be excluded, selectively, from the hydraulic circuit C thanks to other fluidic interception means. The exclusion can take place, for example, after starting the apparatus 10, that is, after having carried out the recirculation of aqueous solution in the cathode part of the latter.

In some embodiments, which can be combined with all the embodiments described here, the apparatus 10 can provide an inlet to the cathode part, advantageously to introduce an inert gas, for example, nitrogen. This introduction has the purpose of cleaning the volume of the cathode half-cell of hydrogen at the end of the production process.

Furthermore, with reference to FIG. 2 which shows one embodiment, a process for generating hydrogen $H_2$ and oxygen $O_2$ through alkaline electrolysis constitutes an independent aspect which can be used independently with respect to the other aspects of the invention, the process comprising the following steps:

step 100: preparing at least one apparatus 10 as described here in detail;

step 101: by means of the pair of metal electrode-holders 4, 5, letting the aqueous solution flow uniformly distribute over the whole surface of the electrodes 6, 7 and carrying the electric current from the current-holder metal plates 1, 2 to the electrodes 6, 7;

step 102: generating hydrogen $H_2$ and oxygen $O_2$ through alkaline electrolysis of the aqueous solution.

Preferably, the uniform aqueous solution flow has a flow rate ranging between 0.7 l/min and 180 l/min, more preferably equal to 3 l/min.

Preferably, the carriage of the electric current takes place at a surface density ranging between 0.01 and 1 $A/cm^2$, more preferably equal to 0.45 $A/cm^2$.

Preferably, the generation of hydrogen $H_2$ and oxygen $O_2$ takes place with alkaline solution at a temperature lower than 50° C.

Figure 3:
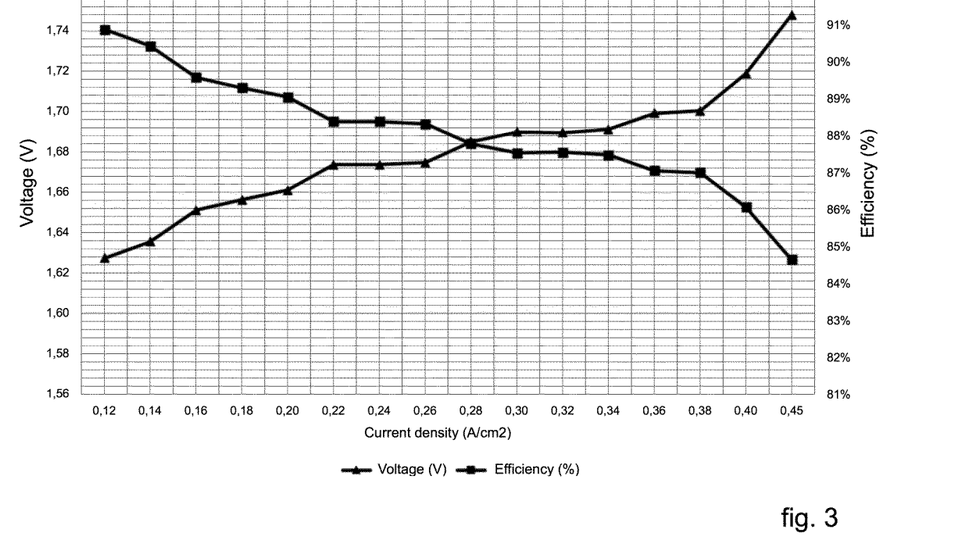
FIG. 3 is a graph showing the trend of the efficiency with the current density.

With reference to FIG. 3 it can be observed that one embodiment of the apparatus for generating hydrogen and oxygen according to the present description functions with an aqueous solution only in the anode part with a concentration of KOH between 1 and 3% by weight which produces hydrogen and oxygen at a differential pressure of 30:1.

In one possible embodiment of the process, there is also provided a step 1011 in which each one of the electrode-holders 4, 5 is immersed, at least partly, in an alkaline aqueous solution, for example having potassium hydroxide in concentration lower than 5% by weight.

Preferably, the step 1011 takes place after step 100 and before, or simultaneously with, at least a part of step 101.

In fact, as already stated above, in accordance with one embodiment (FIG. 4), the apparatus for generating hydrogen and oxygen described here can function with an alkaline aqueous solution, for example having a concentration of KOH between 1 and 3% by weight on the anode part, and with an alkaline aqueous solution, for example having a concentration of potassium hydroxide (KOH) lower than 5% by weight, present on the cathode part, at least initially, that is, before the production of hydrogen and oxygen by the apparatus. In fact, in this other embodiment, the cathode part is, at least in part and at least at start-up, immersed in an alkaline aqueous solution, for example having a concentration of potassium hydroxide (KOH) lower than 5% by weight, before the apparatus itself starts to produce hydrogen and oxygen.

As described above, this allows to humidify the polymeric membrane more quickly than in the embodiment that provides to start from a dry cathode and in which the aqueous solution is only on the anode part. Advantageously, also having a degree of humidity, or hydration, on the cathode part, or face, of the polymeric membrane when the apparatus is started promotes the anionic transfer from cathode to anode and decreases the time that elapses between starting the apparatus and the beginning of the production of hydrogen and oxygen.

In these embodiments, there can also be comprised, in the apparatus described here, purification means to purify the gas produced from possible residues of humidity.

The good contact between the anode electrode—membrane—cathode electrode and the contact pressure between them allow the apparatus described here to achieve high performance in electrical terms, reaching a nominal voltage between 1.75 and 1.80 volts at current density of 450 mA/cm$^2$, at a temperature of 40° C., and an overall efficiency of 85% on higher calorific value in these conditions. The apparatus for generating hydrogen and oxygen through alkaline electrolysis and the corresponding process of the present description are described below in greater detail with reference to the following examples, which have been developed on the basis of experimental data and which are to be intended as illustrative but not limitative of the present description.

Example 1

Anode Electrode Preparation.

An aqueous solution of iron sulphate heptahydrate with nickel sulphate hexahydrate is prepared, by inserting 70 g of iron sulphate heptahydrate and 130 g of nickel sulphate hexahydrate into a flask with 2 L of demineralized water.

The aqueous solution is brought to a basic pH by adding potassium hydroxide. A percentage of sodium boron hydride is added to the solution until the solution becomes homogeneous and black in color.

The preparation is filtered into a flask, removing all the water and washing the preparation with a solution at 50% of methyl alcohol. The dehydrated preparation is mixed with a solution of PTFE at 60% in the quantity of 1.7 g for every 4 g of preparation.

The mixture is deposited on a calendered porous metal support in the quantity of 40 mg/cm$^2$ and allowed to dry in an oven for about 1.5 hours at 60° C.

Example 2

Cathode Electrode Preparation.

A solution of hexachloroplatinic acid is prepared starting from metallic platinum. A quantity equivalent to 90 mg of platinum is brought into solution with demineralized water by adding cerium oxide and titanium oxide in equal proportions. The solution is stirred until dissolved. Sodium boron hydride is added until the solution is homogeneous and black.

The solution is centrifuged until the aqueous part is separated from the solid part. Ethyl alcohol is added to the de-hydrated preparation to form an ink.

The preparation is then deposited on a conductive support in the quantity of 0.35 mg/cm$^2$ and air-dried.

Example 3

Membrane Preparation.

A solution is prepared comprising 50 g of styrene monomer, 25 g of vinylbenzyl chloride and 5 g of glycidylmethacrylate. The mixture is stirred in a stoppered flask until a homogeneous preparation is obtained. 100 mg of di-benzyl peroxide is added and the preparation is stirred until dissolved. The preparation is heated to 73° C. for 24 hours in a water bath. At the end of the heating, the preparation is brought to 100° C. for 1 hour.

A mixture of 80% acetone and 20% methyl alcohol is added to the preparation in a quantity such as to be able to completely dissolve the preparation.

When in the liquid phase, dimethyl pipperidine is added in a molar quantity equal to the vinylbenzyl chloride previously added. The preparation is stirred for 8 h.

The substance obtained is used to impregnate a porous thermoplastic support made of polypropylene and subsequently air-dried. The support is then activated for 24 hours in a solution at 3% of potassium hydroxide for activation.

Example 4

Assembly of the Electrolytic Cell According to One Embodiment.

The membrane is inserted with its packing in the housing made in the casing 3. The electrodes are assembled with the corresponding supports so that the anode group is in contact with the inflow holes of the alkaline solution while the cathode group is in its housing, in contact with the membrane. The positive and negative current-holders are assembled. The assembly is forced between two electrically insulated metal plates and these are compressed by means of a series of metal tie-rods. The inflow of an alkaline solution at 3% by weight of potassium hydroxide heated to a temperature of 40° C. is allowed. A current equal to 450 mA/cm$^2$ is applied and a voltage of 1.75V is measured at the two ends, equal to an outflow of hydrogen measured with a mass flowmeter at 51.5 Nl/h. The efficiency calculated on higher calorific value is over 85% while the specific energy for producing hydrogen is 3.91 kWh/Nm$^3$.

Example 5

Assembly of the Electrolytic Cell According to Another Embodiment Described Using FIG. 4.

The membrane is inserted with its packing in the housing made in the casing 3. The electrodes are assembled with the corresponding supports so that the anode group is in contact with the inflow holes of the alkaline solution while the cathode group is in its housing, in contact with the membrane and in contact with the respective inlet of alkaline aqueous solution. The positive and negative current-holders are assembled. The assembly is forced between two electrically insulated metal plates and these are compressed by means of a series of metal tie-rods. The inflow of an alkaline solution is allowed, both to the anode part and also to the cathode part, containing potassium hydroxide (KOH) in a concentration lower than 5% by weight, for example 3% by weight of potassium hydroxide, heated to the temperature of 40° C. In this way, at least at start-up the cathode group is also immersed, at least in part, in the alkaline aqueous solution. A current equal to 450 mA/cm$^2$ is applied and a voltage of 1.75V is measured at the two ends, equal to an outflow of hydrogen measured with a mass flowmeter at 51.5 Nl/h. The efficiency calculated on higher calorific value is over 85% while the specific energy for producing hydrogen is 3.91 kWh/Nm$^3$.

The apparatus for generating hydrogen and oxygen through alkaline electrolysis and the corresponding process of this description are compared with known solutions, as described below.

In European Patent n. EP 2 451 992 B1 discussed above as a known technical solution, and in particular in Example 4 reported therein, a production of hydrogen is described by means of an electrolytic cell with anion exchange membrane that uses an alkaline solution of potassium hydroxide at 1%; the tests are performed at a temperature of 30° C. with a current density of 500 mA/cm$^2$ and a production of hydrogen of 13.5 L/h at a pressure of 50 bar is measured.

The results of the comparison between the present invention and the known solutions are summarized in the table below.

TABLE

| Ref | Current density (mA/cm$^2$) | Active surface (cm$^2$) | Current (A) | Temperature (° C.) | Voltage (V) | Power (W) | Production (Nl/h) | Specific energy (KWh/M$^3$) |
|---|---|---|---|---|---|---|---|---|
| A | 500 | 78.5 | 39.3 | 30 | 1.90 | 74.5 | 13.5 | 5.52 |
| B | 450 | 256 | 115.2 | 40 | 1.75 | 201.6 | 51.5 | 3.95 |

The table above shows the value of the specific production energy which in the case of Example 4 of European Patent no. EP 2 451 992 B1—identified with reference "A"—is equal to 5.52 kWh/m$^3$; it should be noted that this datum is calculated considering the electric power used and the hydrogen production declared.

In the same way, the specific production energy according to the present invention was considered—case identified with reference "B"—which is 3.91 kWh/m$^3$.

As can be deduced from the above, the innovative technical solution described here has the following advantageous characteristics:
  producing uncontaminated hydrogen and oxygen;
  increasing electrical efficiency;
  decreasing the specific production energy;
  capturing fluctuating electric currents typical of renewable energy systems;
  improving the safety of gas separation on the production side;
  obtaining a good purity of the gas at exit, that is to say, with a purity higher than 99.5% by volume;
  using an electrolyte solution with a percentage by weight of 1-3% of potassium hydroxide (KOH);
  using a process water according to the ASTM Type II standard;
  using non-noble metals for the anodic catalysts;
  using internal geometric shapes to obtain high efficiencies From the above description it is therefore evident how the apparatus for generating hydrogen and oxygen through alkaline electrolysis and the corresponding process according to the present invention allow to achieve the proposed purposes.

It is equally clear to a person of skill in the art that it is possible to make modifications and other variants to the solution described with reference to the attached drawings, without thereby departing from the teachings of the present invention and from the scope of protection as defined by the attached claims.

The invention claimed is:

1. Apparatus for generating hydrogen ($H_2$) and oxygen ($O_2$) through alkaline electrolysis, the apparatus comprising
   a pair of current-holder metal plates to which a direct electric current between 1 A and 250 A is applied;
   a casing made of an electrically non-conductive material and able to bear an internal relative pressure of a gas ranging between 1 and 50 bar;
   a pair of metal electrode-holders, each electrode-holder being porous and able to absorb an aqueous solution and having a compression mechanical resistance ranging between 1.5 and 8 MPa to resist deformation impressed by the internal relative pressure while maintaining flatness;
   a pair of electrodes, each electrode being placed in contact with the corresponding electrode-holder and being made with nanometric powders of metal mixtures deposited on each corresponding electrode-holder;
   a polymeric membrane made of an electrically non-conductive material, porous to the aqueous solution but not to the gas, wherein the pair of metal electrode-holders allows the aqueous solution to flow uniformly distributed over an entire surface of the electrodes and carries the electric current from the current-holder metal plates to the electrodes.

2. The apparatus according to claim 1, wherein the pair of current-holder metal plates is made of steel or nickel.

3. The apparatus according to claim 1, wherein the electrically non-conductive material of the casing is a thermoplastic polymer.

4. The apparatus according to claim 1, wherein the gas is selected from the group consisting of: nitrogen, hydrogen, oxygen and helium.

5. The apparatus according to claim 1, wherein the pair of metal electrode-holders is made of stainless steel or nickel.

6. The apparatus according to claim 1, wherein each metal electrode-holder has a porosity ranging between 30% and 90%.

7. The apparatus according to claim 1, wherein the aqueous solution is an alkaline solution.

8. The apparatus according to claim 1, wherein the negative electrode comprises a platinum catalyst in a quantity lower than 1 mg/cm$^2$.

9. The apparatus according to claim 1, wherein the positive electrode comprises a catalyst composed of an alloy of iron and nickel.

10. The apparatus according to claim 9, wherein in the alloy of iron and nickel the metals are in a ratio ranging between 1 and 3.

11. The apparatus according to claim 1, wherein the electrically non-conductive material of the polymeric membrane is a plastic material resistant to an alkaline environment selected from thermoplastic materials, having a porosity between 40 and 60%, with a pore diameter ranging between 0.01 and 0.1 microns.

12. The apparatus according to claim 11, wherein the polymeric membrane has a thickness ranging between 20 and 200 microns, to reduce a resistance to the passage of electrons and to increase electrical efficiency.

13. The apparatus according to claim 1, wherein each electrode-holder is immersed, at least partly, in an alkaline aqueous solution having potassium hydroxide in a concentration lower than 5% by weight.

14. The apparatus according to claim 13, wherein the electrode-holder of a cathode part of the apparatus is selectively immersed, at least partly, in an alkaline aqueous solution having potassium hydroxide in a concentration lower than 5% by weight.

15. A process for generating hydrogen ($H_2$) and oxygen ($O_2$) through alkaline electrolysis comprising the following steps:

step 100: preparing at least one apparatus according to claim 1;

step 101: by means of the pair of metal electrode-holders, letting the aqueous solution flow uniformly distribute over a whole surface of the electrodes and carrying the electric current from the current-holder metal plates to the electrodes;

step 102: generating hydrogen ($H_2$) and oxygen ($O_2$) through alkaline electrolysis of the aqueous solution.

16. The process according to claim 15, wherein the uniform aqueous solution flow has a flow rate ranging between 0.7 l/min and 180 l/min.

17. The process according to claim 15, wherein the carriage of the electric current takes place at a surface density ranging between 0.01 and 1 A/cm$^2$.

18. The process according to claim 15, wherein the generation of hydrogen ($H_2$) and oxygen ($O_2$) takes place with alkaline solution at a temperature lower than 50° C.

19. The process according to claim 15, further comprising:

step 1011 in which each of said electrode-holders is, at least partly, immersed in an alkaline aqueous solution having potassium hydroxide in a concentration lower than 5% by weight.

20. The process according to claim 19, wherein said step 1011 takes place after said step 100 and before, or simultaneously with at least a part of, said step 101.

* * * * *